(12) United States Patent
Matsumoto (10) Patent No.: US 9,891,766 B2
(45) Date of Patent: Feb. 13, 2018

(54) DISPLAY DEVICE

(71) Applicant: MITSUBISHI ELECTRIC CORPORATION, Tokyo (JP)

(72) Inventor: Shigeyuki Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/636,743

(22) Filed: Mar. 3, 2015

(65) Prior Publication Data
US 2015/0253495 A1    Sep. 10, 2015

(30) Foreign Application Priority Data

Mar. 5, 2014 (JP) ................................. 2014-042428

(51) Int. Cl.
| | | |
|---|---|---|
| *G06F 3/045* | (2006.01) | |
| *G06F 3/044* | (2006.01) | |
| *G06F 1/16* | (2006.01) | |
| *G06F 3/041* | (2006.01) | |

(52) U.S. Cl.
CPC ............ *G06F 3/044* (2013.01); *G06F 1/1643* (2013.01); *G06F 3/0412* (2013.01)

(58) Field of Classification Search
CPC .......... G02F 2001/13308; G02F 2001/133311; G02F 2001/13314; G02F 2001/13317; G02F 2001/1332; G02F 2001/13322; G02F 2001/13325; G02F 2001/13328; G02F 1/1333; G02F 2001/13357; G02F 2201/54; G02F 2202/28; G02F 1/133308; G02F 2001/133331; G02F 2001/133334; G02F 2201/503

USPC ........................................................... 349/58
See application file for complete search history.

(56) References Cited

U.S. PATENT DOCUMENTS

| | | | | |
|---|---|---|---|---|
| 5,261,202 A | * | 11/1993 | Brunet ................... | B64D 43/00 52/202 |
| 6,067,133 A | * | 5/2000 | Niibori .............. | G02F 1/133308 349/150 |
| 6,879,318 B1 | * | 4/2005 | Chan .................. | G02F 1/133308 178/18.01 |
| 2005/0259191 A1 | * | 11/2005 | Park .................. | G02F 1/133308 349/58 |

(Continued)

FOREIGN PATENT DOCUMENTS

| | | |
|---|---|---|
| JP | 2009-122398 A | 6/2009 |
| JP | 2011-075605 A | 4/2011 |

(Continued)

*Primary Examiner* — Kent Chang
*Assistant Examiner* — Mark Edwards
(74) *Attorney, Agent, or Firm* — Studebaker & Brackett PC (57) ABSTRACT

A display device includes: a light source unit; a holding frame that stores the light source unit therein; a display panel that is disposed to face the light source unit; and a transparent member that is disposed on a front surface side of the display panel, wherein the holding frame includes a planar portion which is formed to face a periphery portion of a rear surface side of the transparent member, and wherein the holding frame includes a bonding member which is disposed on the planar portion and bonds the transparent member and the holding frame, and wherein the planar portion provided with a convex protrusion protruding toward the transparent member.

5 Claims, 6 Drawing Sheets

(56) References Cited

U.S. PATENT DOCUMENTS

| | | | |
|---|---|---|---|
| 2012/0062823 A1* | 3/2012 | Takatani | G02B 5/3033 349/96 |
| 2012/0230016 A1 | 9/2012 | Hashino et al. | |
| 2013/0222706 A1* | 8/2013 | Hashimoto | H04N 5/64 348/836 |

FOREIGN PATENT DOCUMENTS

| | | | | |
|---|---|---|---|---|
| JP | 2011075605 A | * | 4/2011 | G02F 1/1333 |
| JP | 2012-098393 A | | 5/2012 | |

* cited by examiner

DISPLAY DEVICE

CROSS-REFERENCE TO RELATED APPLICATION

This application claims priority from Japanese Patent Application No. 2014-042428 filed on Mar. 5, 2014, the entire subject matter of which is incorporated herein by reference.

TECHNICAL FIELD

This disclosure relates to a display device, and more specifically, to a display device having a transparent member such as a touch panel or a protective member on the display surface side of a display panel.

BACKGROUND ART

According to popularization of electronic information devices, display devices each having an input device such as a touch panel on the display surface side of a display panel, or display devices having a transparent member having toughness such as a protective member are widely used.

It is often the case that, in order to suppress deterioration of visibility due to reflection of external light from a surface, and in order to protect a display device from an impact from the outside, exposure to water, dust, or the like, a touch panel or a protective member is bonded to the display surface of the display device by glass bonding using a transparent resin or the like, thereby being integrated with the display device. Also, if the touch panel or the protective member is made larger than the display surface of the display device such that a waterproof and dustproof area of the periphery portion widens, it is possible to obtain high waterproof and dustproof effect.

According to a protective plate integrated display device of Japanese Patent Application Laid-Open No. 2011-75605, a protective plate and a planar portion of the outer circumferential edge portion of a housing for holding a display device are bonded by an adhesive member, and the protective plate is surrounded and held. Also, a display panel is pressed against the protective plate by a cushioning member disposed between the display panel and the housing, thereby being held by elastic rebound force.

According to a display device of Japanese Patent Application Laid-Open No. 2009-122398, a transparent protective plate disposed on the front surface side of a display unit is bonded to the display panel by a transparent elastic body, and the display unit and the transparent protective plate are attached to an external housing for storing the transparent protective plate, by a fixing member.

When the protective plate integrated display device disclosed in Japanese Patent Application Laid-Open No. 2011-75605 is assembled to the final product, if the adhesive member is fixed while a compression load being added to the adhesive member, the adhesive member is thinned due to creep (the degree of deformation increases as time goes on) in the long term. Then, the load is applied to the display panel, thereby resulting in display unevenness or the like. Also, in a case where the force holding the display device decreases, a rattling sound or displacement occurs due to an external force such as vibration.

Also, when the display device disclosed in Japanese Patent Application Laid-Open No. 2009-122398 is assembled to the final product, a cushioning member or an elastic body is not used between the transparent protective plate and the display unit. Therefore, if transparent protective plate, the transparent adhesive member, and the like are partially bent or deformed due to application of an external force such as bending of the frame of the display unit, or bending of the fixing member, display unevenness occurs in the display unit.

SUMMARY

This disclosure is to stably hold a display device including a transparent member, and suppress occurrence of display unevenness in a display panel and breakage of the display panel due to an external force or the like.

A display device of this disclosure includes: a light source unit; a holding frame that stores the light source unit therein; a display panel that is disposed to face the light source unit; and a transparent member that is disposed on a front surface side of the display panel, wherein the holding frame includes a planar portion which is formed to face a periphery portion of a rear surface side of the transparent member, and wherein the holding frame includes a bonding member which is disposed on the planar portion and bonds the transparent member and the holding frame, and wherein the planar portion provided with a convex protrusion protruding toward the transparent member.

According to the configuration of this disclosure, it is possible to stably hold a display device including a transparent member, and suppress occurrence of display unevenness in a display panel and breakage of the display panel due to an external force or the like.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

Hereinafter, this disclosure will be described with reference to the accompanying drawings.

Figure 1:
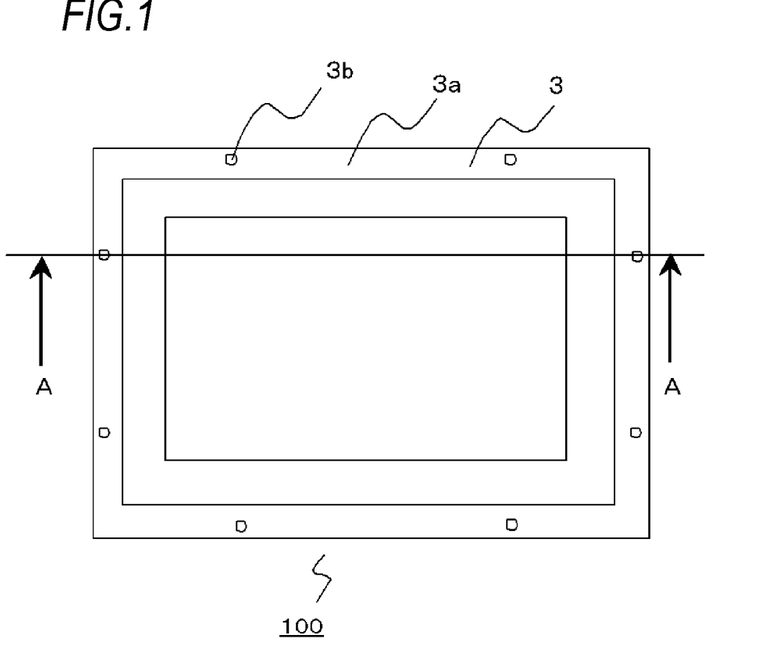
FIG. 1 is a top view illustrating a display device according to a first embodiment of this disclosure.
Figure 2:
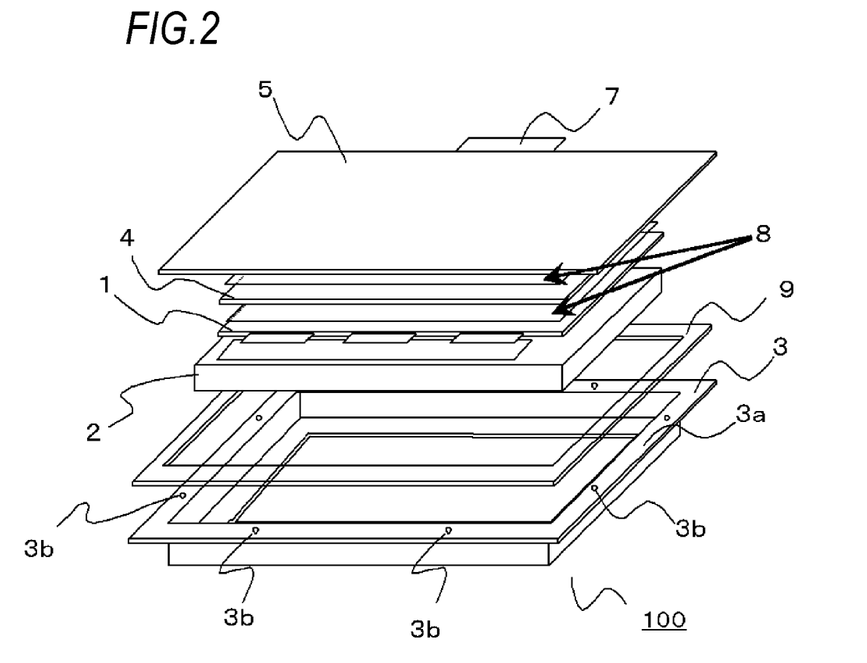
FIG. 2 is an exploded perspective view illustrating the display device according to the first embodiment of this disclosure.
Figure 3:
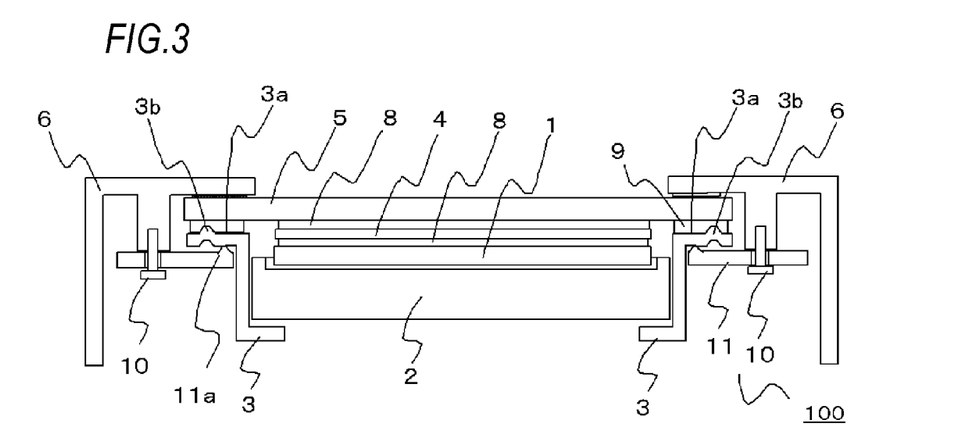
FIG. 3 is a cross-sectional view illustrating a state where an external housing and fixing components have been added to the display device of FIG. 1, as taken along a line A-A.

FIG. 1 is a top view illustrating a display device 100 according to a first embodiment of this disclosure, and FIG. 2 is an exploded perspective view illustrating the display device 100 according to the first embodiment of this disclosure, and FIG. 3 is a cross-sectional view illustrating a state where an external housing and fixing components have been added to the display device 100 of FIG. 1, as taken along a line A-A.

<Overall Configuration of Display Device>

As shown in FIGS. 1 to 3, the display device 100 of the present embodiment includes a display panel 1, a planar light source unit 2 for irradiating the display panel 1, and a holding frame 3 which stores the planar light source unit 2 therein and a planar portion 3a having an opening. Also, the display device 100 includes transparent members such as a touch panel 4 and a protective member 5, which are provided on the display surface side of the display panel 1. In the first embodiment, the touch panel 4 is provided on the display surface side of the display panel 1. In order to protect the touch panel 4, the protective member 5 is provided on the front surface of the touch panel 4 to be disposed on the operator side. The touch panel 4 is fixed on the protective member 5, by a transparent adhesive member 8 on the rear surface of the protective member 5. The display panel 1 is fixed on the touch panel 4 by a transparent adhesive member 8 on the rear surface of the touch panel 4.

Also, a bonding member 9 is disposed at the edge portion of the rear surface side of the protective member 5 so as to surround the substantially whole circumference of the planar portion 3a, and the protective member 5 are fixed to the holding frame 3a by bonding member 9. In this case, the display panel 1 and the touch panel 4 are not fixed directly on the holding frame 3 and are held on the holding frame 3 via the protective member 5. Also, on an edge portion of the touch panel 4, an output wiring member 7 is disposed to output signals from the touch panel 4.

<Display Panel>

The display panel 1 is a transmissive panel, and it may be a plasma display panel, a liquid crystal display panel, or the like. A liquid crystal display panel uses birefringence of liquid crystal, and includes a first substrate (hereinafter, referred to as color filter substrate) formed by forming a colored layer, a light shielding layer, a counter electrode, and the like on an insulating substrate such as a glass substrate, and a second substrate (hereinafter, referred to as TFT array substrate) formed by forming thin film transistors (hereinafter, referred to as TFTs) for serving as switching elements, pixel electrodes, and the like on an insulating substrate such as a glass substrate. Also, the liquid crystal display panel includes spacers for maintaining a gap between the first substrate and the second substrate, a sealing material for bonding the color filter substrate and the TFT array substrate, liquid crystal which is interposed between the color filter substrate and the TFT array substrate, a sealing material for an inlet for injecting the liquid crystal, orientation films for orienting the liquid crystal, polarizing plates, and so on (not shown).

<Holding Frame>

The holding frame 3 is a member for storing the display panel 1, the planar light source unit 2, the touch panel 4, and the like, and it may be formed of a thin metal plate or a resin. In a case of a thin metal plate, cuts (not shown) for processing may be made if necessary. The holding frame 3 may be formed as one body, or may be formed by combining a plurality of members. Also, as shown in FIG. 3, the holding frame 3 is interposed between an external housing 6 and a fixing member 11 and is fixed by screws 10.

<Planar Light Source Unit>

The planar light source unit 2 includes a light source which emits light and a case which holds a light guiding plate for propagating the light emitted from the light source, and the like (although both of the light source and the case are not shown in the drawings), and the planar light source unit 2 irradiates the display panel 1 from the rear surface side which is opposite to the display surface.

<Touch Panel>

The touch panel 4 converts information of position coordinates input from the outside (an operator) into an electric signal by a circuit based on transparent electrodes formed on a transparent substrate, and then transmits the electric signal to a control circuit (not shown) of an external housing by the output wiring member 7. Also, in the present embodiment, the touch panel 4 is of a projected capacitive type. The projected capacitive type touch panel 4 senses a touch of, for example, the tip of a finger of the operator, and measures the ratio of the amount of current of the touched point to an amount of current based on a plurality of electrode patterns around the touched point, thereby accurately detecting the position of the finger and inputting the signal. Also, as upper and lower substrates constituting the touch panel 4, for example, transparent glass substrates and the like is used. In terms of a reduction in the cost and weight of the display device, the thinner touch panel 4 is preferable. For this reason, in view of suitableness in a transparent-electrode forming process, if glass that has a thickness of 0.7 mm or less and is widely used for liquid crystal display panels is employed, it is possible to easily obtain reliable substrates to suppress the cost.

<Protective Member>

The protective member 5 is for suppressing damage, deformation, abrasion, contamination, and the like of the touch panel 4 and the display panel 1 due to external pressures or external touches, and it is generally formed of a transparent material such as glass or plastic. In the present embodiment, the protective member 5 is formed of high-strength glass unlike to be deformed. Also, it is preferable to form the protective member 5 thicker than the color filter substrate or TFT array substrate of the display panel 1, or the touch panel 4 such that the protective member 5 is more rigid than the other members. If printing or painting is performed on the front surface or rear surface of the protective member 5, a function as a design member can be added to the protective member 5. If an anti-glare (AG) process or an anti-reflection (AR) process for suppressing reflection can be performed on the front surface of the protective member 5, it is possible to improve visibility. If a process for microasperity, soil-repellent finishing, water-repellent finishing, oil-repellent finishing, and the like is performed on the front surface of the protective member 5, it is possible to improve surface slipperiness and the anti-fouling property when the touch panel 4 is operated.

<FPC>

As the output wiring member 7, in general, a flexible printed circuit (FPC) having a high degree of flexibility is used. However, as long as a member having functions and properties equivalent to those of the output wiring member 7 can be implemented, any other material and any other configuration can be used. The output wiring member 7 is stored on the inner wall side of the holding frame 3. Therefore, it is possible to suppress the output wiring member 7 from being broken due to an external force, and in a case where the holding frame 3 is formed of a metal, it is possible to suppress the output wiring member 7 from being broken due to static electricity or the like from the outside.

<Transparent Adhesive Members and Bonding Member>

The transparent adhesive members 8 and the bonding member 9 are double-sided tape or an adhesive material. The bonding member 9 may be formed by disposing double-sided tape, an adhesive agent, or the like on a cushioning member having a cushioning property. Also, the cushioning member having a cushioning property may be formed of a resin, or a hardening resin such as a thermosetting resin or an ultraviolet curable resin. If a hardening resin such as a thermosetting resin or an ultraviolet curable resin is used, since the adhesive strength becomes strong as time goes on, it is possible to further improve the adhesive property. Also, the bonding member 9 may be formed as one-piece or may be configured by combining a plurality of members. The display panel 1 is fixed on the rear surface of the touch panel 4 by the transparent adhesive member 8, and the touch panel 4 is fixed on the rear surface of the protective member 5 by the transparent adhesive member 8, whereby those members are combined into an integrated unit. Therefore, the integrated unit is superior to each single member in bending stress is unlikely to be deformed.

<Fixing Member>

The fixing member 11 is composed of a metal member or a resin member, and has a mounting hole, a screw groove, or the like for attaching the fixing member to the external housing 6. The fixing member 11 is pressed against the protective member 5, the bonding member 9, and the planar portion 3a of the holding frame 3 from the rear surface side, and then is fixed on the external housing 6 by the screws 10. If the external housing 6 and the holding frame 3 constituting the display device 100 is fixed by the screws 10 with interposing fixing member 11, the bonding member 9 disposed between the protective member 5 and the planar portion 3a of the holding frame 3 is compressed. As a result, a gap between the protective member 5 and the holding frame 3 is blocked, and the display device 100 is sealed.

Subsequently, the configuration of the present embodiment will be described.

According to the display device 100 of the present embodiment, the holding frame 3 includes the planar portion 3a, which is formed so as to correspond to the periphery portion of the protective member 5 and have convex protrusions 3b protruding toward the protective member 5. As described above, the planar portion 3a of the holding frame 3 having the convex protrusions 3b is bonded to the protective member 5 by the bonding member 9. At this time, the convex protrusions 3b cause a difference in the amount of compression of the bonding member 9 which is disposed on the planar portion 3a between the vicinities of the convex protrusions 3b and the other area. Specifically, the amount of compression of the bonding member 9 which is disposed on the convex protrusions 3b is set so as not to be greater than half of the thickness of the bonding member 9 in the thickness direction of the display device and so as to be larger than that of the other area.

Subsequently, the effects according to the configuration of the present embodiment will be described.

The convex protrusions 3b are formed at portions of the planar portion 3a of the holding frame 3 to face the protective member 5, and the bonding member 9 is disposed on the planar portion, so that the amount of compression of the bonding member 9 is large in the vicinities of the convex protrusions 3b and is small at the other area. Therefore, the bonding member 9 is suppressed from being excessively compressed so as to exceed its compressive strength limit. As a result, it is possible to suppress occurrence of cracks and the like in the bonding member 9, to suppress the whole bonding member 9 from losing elasticity and being thinned in the long term, resulting in compression set (a state where the adhesive member has been deformed and cannot be restored), and to suppress a gap between the protective member 5 and the holding frame 3 from widening and resulting in a degradation in water-proof function.

Also, according to this configuration, since it is possible to control a decrease in the thickness of the whole bonding member 9, it is possible to suppress rattling or displacement of the protective member 5 and the holding frame 3 due to a reduction in the fixing force of the fixing member 11, and it is possible to suppress display unevenness or the like from occurring due to a load which is applied to the display panel 1 by influence of an external force or the like which is generated when the fixing member 11 is fixed on the external housing 6.

Also, since the amount of compression of the bonding member 9 is large in the vicinities of the convex protrusions 3b, the bonding member 9 is suppressed from moving from the vicinities of the convex protrusions 3b.

Also, the height of the convex protrusions 3b may be set so as to be equal to the thickness of bonding member 9 in the thickness direction of the display device, preferably, so as not to be larger than half of the thickness of bonding member 9 in the thickness direction of the display device. Also, it is preferable that each convex protrusion 3b should have any one of a semicircular shape, a trapezoidal shape, a rectangular shape, and a triangular shape as its cross-sectional shape. Especially, it is preferable to adjust the shape and quantity of the convex protrusions 3b on the basis of the elastic modulus and hardness of the material of the bonding member 9.

Also, since the position of the protective member 5 in a height direction is defined by the convex protrusions 3b. In a case where bending of the holding frame 3 of the display device 100, bending of the fixing member 11, bending of the external housing 6, a variation in the boss heights of screw fixing portions of the external housing 6, or the like occurs, it is possible to adjust the heights of the convex protrusions 3b, Therefore, it is possible to suppress bending or deformation from being transmitted to the protective member 5, the touch panel 4, the transparent adhesive member, and the like, and thus it is possible to suppress display unevenness from occurring in the display device 100.

As described above, according to the configuration of the present embodiment, since the convex protrusions 3b are formed on the protective member (5) side of the planar portion 3a of the holding frame 3, it is possible to suppress a reduction in the thickness of the bonding member 9 disposed in the display device 100 provided with the transparent members such as the touch panel 4 and the protective member 5. Therefore, it is possible to suppress a gap between the external housing 6 and the display device 100 and a gap between the fixing member 11 and the display device 100 from increasing as time goes on, and it is possible to stably hold the display device 100 in the long term. Also, even if the external housing 6 or the protective member 5 receives an excessive force from the outside, it is possible to suppress display unevenness from occurring in the display panel 1 and it is possible to suppress the display panel 1 from being broken.

Figure 11:
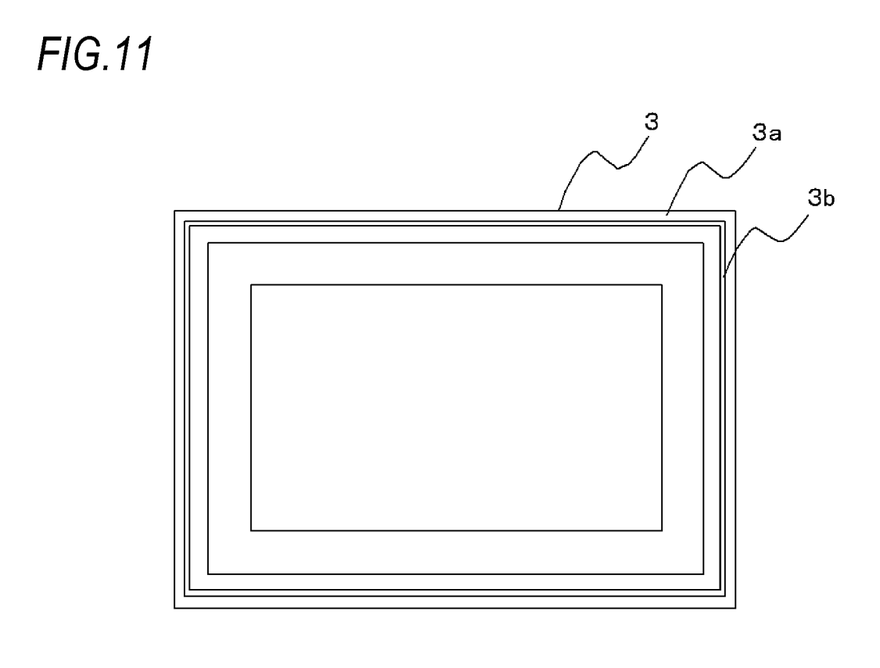
FIG. 11 is a top view illustrating a display device according to a modification of the first embodiment of this disclosure.

Also, the convex protrusions 3b are dispersively provided as shown in FIG. 1. However, as shown in of FIG. 11 illustrating the top view of a holding frame 3, a convex protrusion may be continuously and circumferentially formed at the planar portion 3*a*. In the case where a convex protrusion is circumferentially formed all in the planar portion 3*a*, as compared to a case where convex protrusions are dispersively provided, it is possible to improve the flexural rigidity of the holding frame 3, and it is possible to uniformize the amount of gap between the holding frame 3 and the protective member 5 over the entire surface of the planar portion 3*a*. Therefore, it is possible to provide an effect of becoming advantageous in uniformizing the amount of compression of the bonding member 9.

Second Embodiment

Figure 4:
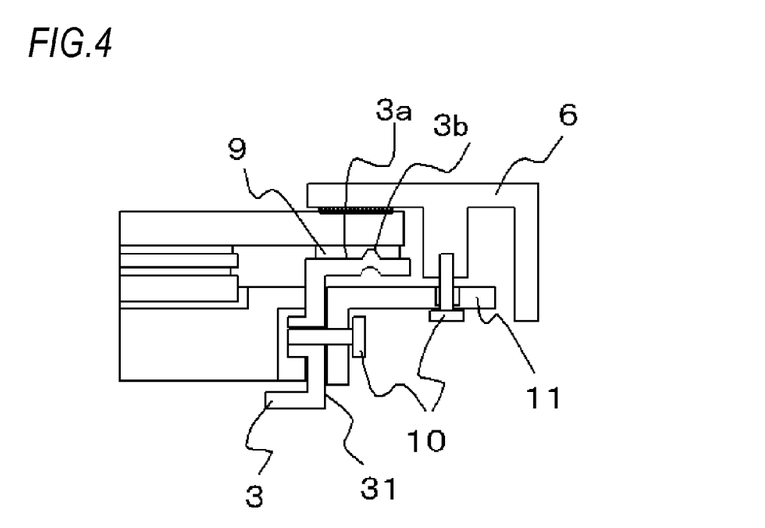
FIG. 4 is a cross-sectional view illustrating a display device according to a second embodiment of this disclosure.

FIG. 4 is a cross-sectional view for explaining the configuration of a display device 100 according to a second embodiment of this disclosure. Hereinafter, the second embodiment of this disclosure will be described with reference to FIG. 4. In the first embodiment, the holding frame 3 does not have mounting holes, screw grooves, or the like for attaching the holding frame 3 to the fixing member 11. However, in the second embodiment, as shown in FIG. 4, side surfaces 31 of the holding frame 3 include mounting portions. As the mounting portions, mounting holes, screw grooves, or the like for attaching the holding frame 3 to the fixing member 11 can be provided. The fixing member 11 is pressed against the planar portion 3*a* of the holding frame 3 from the rear surface side, and then is fixed to the external housing 6 by the screws 10. Also, except for configurations and effects which are described in the second embodiment, the others are the same as those of the first embodiment, and thus will not be described.

If the external housing 6 is fixed by the screws 10, the bonding member 9 disposed between the protective member 5 and the holding frame 3 is compressed, whereby a gap between the protective member 5 and the holding frame 3 is blocked and the display device 100 is sealed. Also, the amount of compression of the bonding member 9 is set by the convex protrusions 3*b* provided on the protective member (5) side of the holding frame 3. Since the fixing member 11 is fixed on the holding frame 3 and the external housing 6 by screws, the holding frame 3 can be firmly fixed so as not to move in X, Y, and Z directions with respect to the external housing 6 and so as not to rotate with respect to the external housing 6. Also, the number and positions of the mounting portions and directions in which the mounting portions are mounted on the external housing may be arbitrarily set.

Third Embodiment

Figure 5:
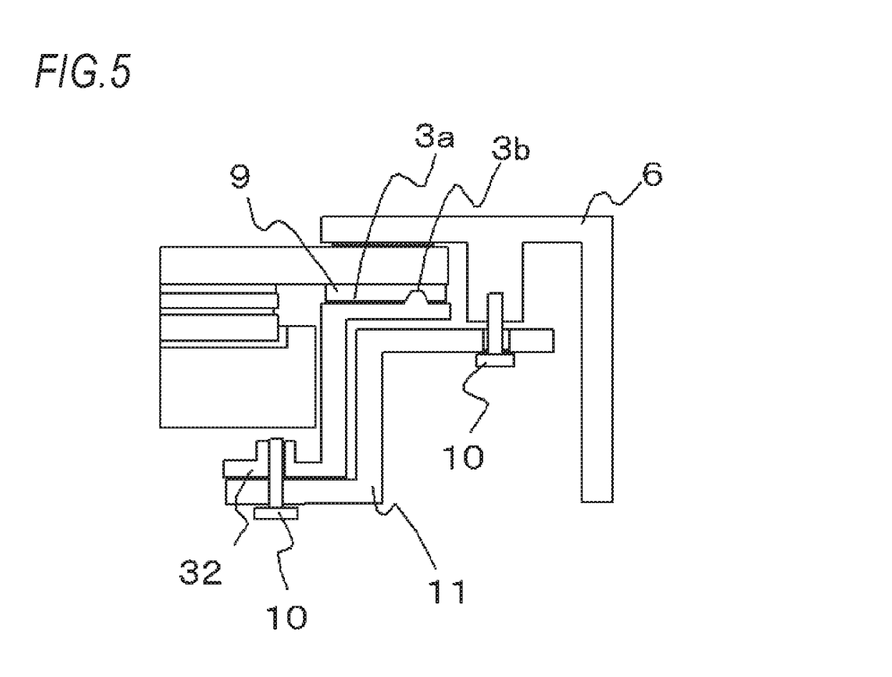
FIG. 5 is a cross-sectional view illustrating a display device according to a third embodiment of this disclosure.

FIG. 5 is a cross-sectional view for explaining the configuration of a display device 100 according to a third embodiment of this disclosure. Hereinafter, the third embodiment of this disclosure will be described with reference to FIG. 5. In the first embodiment, the holding frame 3 does not have mounting holes, screw grooves, or the like for attaching the holding frame 3 to the fixing member 11. However, in the third embodiment, as shown in FIG. 5, the rear surface 32 of the holding frame 3 includes mounting portions. As the mounting portions, mounting holes, screw groove, or the like for attaching the holding frame 3 to the fixing member 11 can be provided. The fixing member 11 is pressed against the planar portion 3*a* of the holding frame 3 from the rear surface side, and then is fixed to the external housing 6 by the screws 10. Also, except for configurations and effects which are described in the third embodiment, the others are the same as those of the first embodiment, and thus will not be described. Also, the number and positions of the mounting portions and directions in which the mounting portions are mounted on the external housing may be arbitrarily set.

Fourth Embodiment

Figure 6:
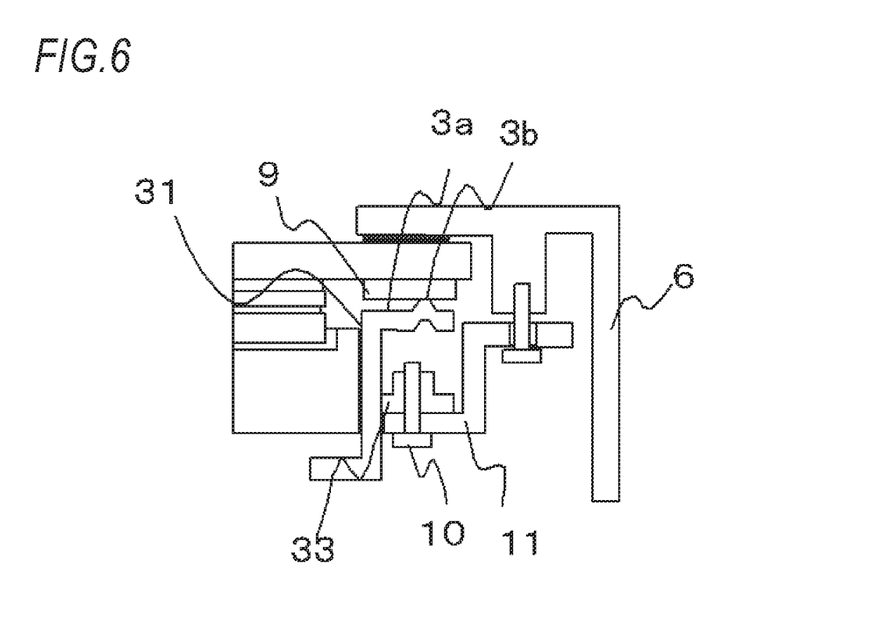
FIG. 6 is a cross-sectional view illustrating a fourth embodiment of this disclosure.

FIG. 6 is a cross-sectional view for explaining the configuration of a display device 100 according to a fourth embodiment of this disclosure. Hereinafter, the fourth embodiment of this disclosure will be described with reference to FIG. 6. In the first embodiment, the holding frame 3 does not have mounting holes, screw grooves, or the like for attaching the holding frame 3 to the fixing member 11. However, in the fourth embodiment, as shown in FIG. 6, side surfaces 31 of the holding frame 3 include mounting portions 33 which are formed in parallel to the planar portion 3*a* at positions different from the planar portion 3*a*. Also, except for configurations which are described in the fourth embodiment, the other configurations are the same as those of the first embodiment, and thus will not be described. Also, except for effects to be described below with respect to the display device 100 according to the fourth embodiment, the other effects are the same as those of the first embodiment, and thus will not be described.

As the mounting portions 33, mounting holes, screw grooves, or the like for attaching the holding frame 3 to the fixing member 11 can be provided. The fixing member 11 is pressed against the planar portion 3*a* of the holding frame 3 from the rear surface side, and then is fixed to the external housing 6 by the screws 10. Also, the number and positions of the mounting portions 33 and directions in which the mounting portions are mounted on the external housing may be arbitrarily set.

Fifth Embodiment

Figure 7:
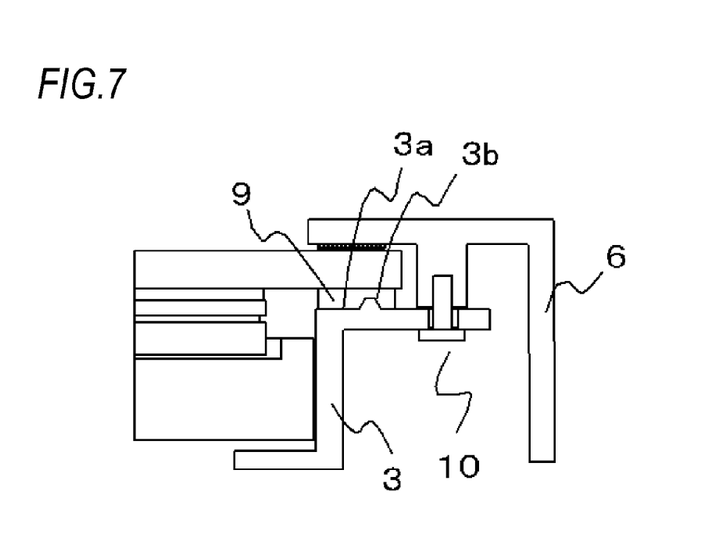
FIG. 7 is a cross-sectional view illustrating a fifth embodiment of this disclosure.

FIG. 7 is a cross-sectional view for explaining the configuration of a display device 100 according to a fifth embodiment of this disclosure. Hereinafter, the fifth embodiment of this disclosure will be described with reference to FIG. 7. In the first embodiment, the holding frame 3 is attached to the external housing 6 by use of the fixing member 11. However, in the fifth embodiment, as shown in FIG. 7, the planar portion 3*a* of the holding frame 3 is extended to include mounting portions on the outer side from the bonding member 9. As the mounting portions, mounting holes, screw grooves, or the like for attaching the holding frame 3 to the fixing member 11 can be provided. The display panel 1 is attached to the external housing by the mounting portions, without using the fixing member 11. Also, except for configurations and effects which are described in the fifth embodiment, the others are the same as those of the first embodiment, and thus will not be described.

The planar portion 3*a* of the holding frame 3 is pressed from the rear surface side, and then is fixed to the external housing 6 by screws 10. According to the display device 100 of the fifth embodiment, since the fixing member 11 is not used, the number of components is less than that of the display device 100 of the first embodiment, and thus it is possible to reduce the cost including assembly cost. Also, the number and positions of the mounting portions and directions in which the mounting portions are mounted on the external housing may be arbitrarily set.

Sixth Embodiment

Figure 8:
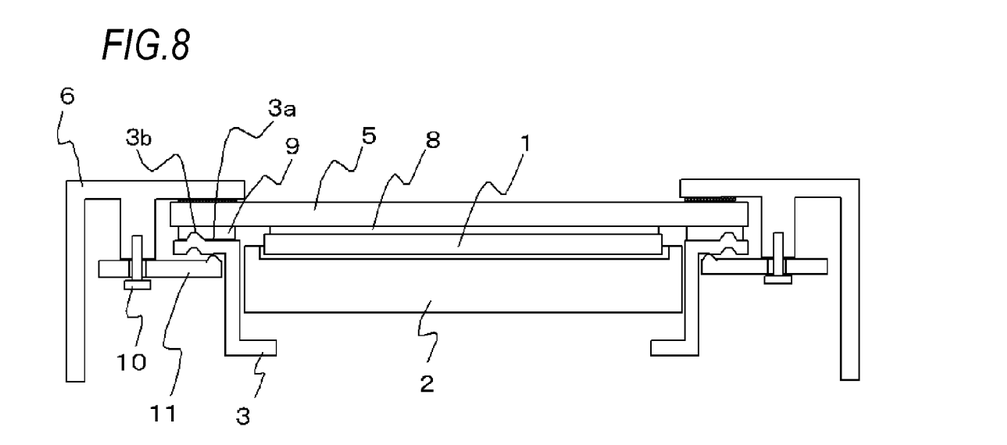
FIG. 8 is a cross-sectional view illustrating a sixth embodiment of this disclosure.

FIG. 8 is a cross-sectional view for explaining the configuration of a display device 100 according to a sixth embodiment of this disclosure. Hereinafter, the sixth embodiment of this disclosure will be described with reference to FIG. 8. In the first embodiment, the touch panel 4 is fixed on the rear surface of the protective member 5 by the transparent adhesive member 8, and the display panel 1 is fixed on the rear surface of the touch panel 4 by the transparent adhesive member 8. However, in the sixth embodiment, as shown in FIG. 8, the display panel 1 is fixed on the rear surface of the protective member 5 by the transparent adhesive member 8, and the touch panel 4 is not disposed. Also, except for configurations and effects which are described in the sixth embodiment, the others are the same as those of the first embodiment, and thus will not be described. According to the present embodiment, even in the display device 100 having no touch panel, it is possible to achieve the same effects as those of the first embodiment.

Seventh Embodiment

Figure 9:
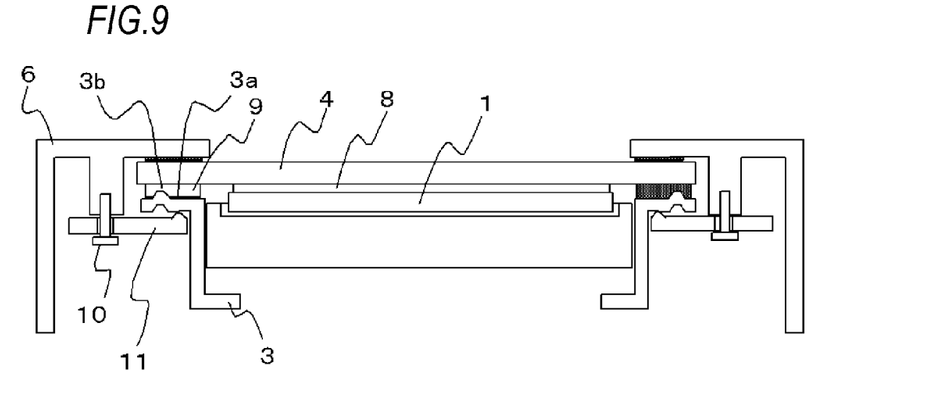
FIG. 9 is a cross-sectional view illustrating a seventh embodiment of this disclosure.

FIG. 9 is a cross-sectional view for explaining the configuration of a display device 100 according to a seventh embodiment of this disclosure. Hereinafter, the seventh embodiment of this disclosure will be described with reference to FIG. 9. In the first embodiment, the touch panel 4 is fixed on the rear surface of the protective member 5 by the transparent adhesive member 8, and the display panel 1 is fixed on the rear surface of the touch panel 4 by the transparent adhesive member 8. However, in the seventh embodiment, as shown in FIG. 9, the display panel 1 is fixed on the rear surface of the touch panel 4 by the transparent adhesive member 8, and the protective member 5 is not disposed. Also, except for configurations and effects which are described in the seventh embodiment, the others are the same as those of the first embodiment, and thus will not be described. According to the present embodiment, even in the display device 100 having no protective member, it is possible to achieve the same effects as those of the first embodiment.

Eighth Embodiment

Figure 10:
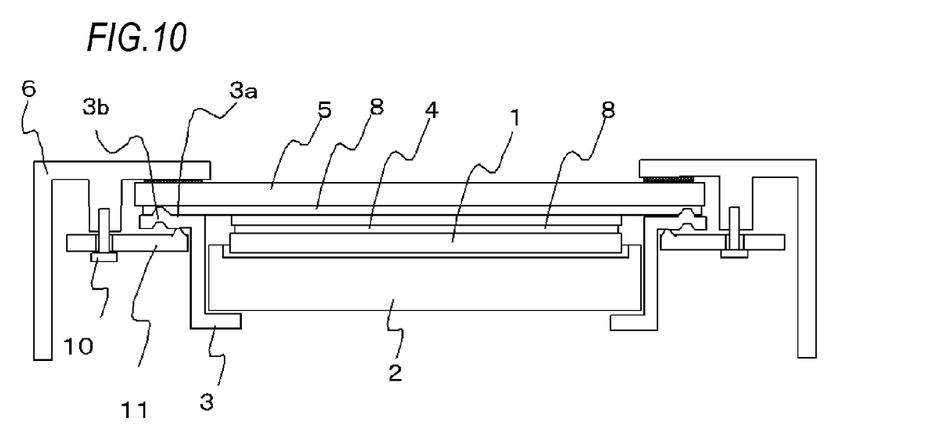
FIG. 10 is a cross-sectional view illustrating an eighth embodiment of this disclosure.

FIG. 10 is a cross-sectional view for explaining the configuration of a display device 100 according to an eighth embodiment of this disclosure. Hereinafter, the eighth embodiment of this disclosure will be described with reference to FIG. 10. In the first embodiment, the touch panel 4 is fixed on the rear surface of the protective member 5 by the transparent adhesive member 8, and the display panel 1 is fixed on the rear surface of the touch panel 4 by the transparent adhesive member 8. On the edge portion of the rear surface side of the protective member 5 having the display panel 1 and the touch panel 4 fixed thereon, the bonding member 9 is disposed so as to surround the substantially whole circumference of the planar portion 3a of the holding frame 3. Then, the protective member 5 is fixed on the holding frame 3 by the bonding member 9. However, in the eighth embodiment, as shown in FIG. 10, a transparent adhesive member 8 is extended so as to surround the substantially whole circumference of the planar portion 3a of the holding frame 3, and is used to fix the protective member 5 on the holding frame 3. Also, except for configurations and effects which are described in the eighth embodiment, the others are the same as those of the first embodiment, and thus will not be described.

According to the present embodiment, since it is possible to remove the bonding member 9, it is possible to reduce the number of components. Also, although the configuration of the first embodiment has been described as an example, even in the configurations of the second to seventh embodiments, similarly, if a transparent adhesive member 8 is extended so as to surround almost circumference of the planar portion 3a of the holding frame 3 and is used to fix the protective member 5 on the holding frame 3, it is possible to provide the same effects.

Also, within the scope of this disclosure, the embodiments of this disclosure can be freely combined, or each embodiment can be appropriately modified or omitted.

Also, although a liquid crystal display device using a liquid crystal display panel as a display panel has been described in each embodiment, even if any other display device is used, it is possible to achieve the same effects as those of the embodiments.

What is claimed is:
1. A display device comprising:
a light source unit;
a holding frame that stores the light source unit therein;
a display panel that is disposed to face the light source unit;
a transparent member that is disposed on a front surface side of the display panel;
a fixing member, which is arranged at a rear side of the holding frame;
a housing, which is arranged at the front surface side of the transparent member; and
a fastening member for fastening the fixing member to the housing,
wherein the holding frame includes a planar portion which is formed to face a periphery portion of a rear surface side of the transparent member,
wherein the holding frame includes a bonding member which is disposed on the planar portion and bonds the transparent member and the holding frame,
wherein the planar portion is provided with a convex protrusion protruding toward the transparent member,
wherein the convex protrusion is continuously and circumferentially formed at the planar portion,
wherein the fixing member applies a first fixing force in a first direction towards the rear surface side of the transparent member,
wherein the housing applies a second fixing force in a second direction towards the front side of the transparent member,
wherein the display panel is not fixed to the holding frame,
wherein the display panel is attached to a central portion of the rear surface side of the transparent member, the central portion located closer to a center of the rear surface side of the transparent member than the periphery portion,
wherein the first fixing force and the second fixing force do not pass through the display panel in a thickness direction thereof,
wherein the first fixing force and the second fixing force pass through the periphery portion of the transparent member, the bonding member and the planar portion of the holding frame in a thickness direction thereof, and
wherein the bonding member comprises a transparent adhesive member extended so as to surround substantially a whole circumference of the planar portion of the holding frame to fix the transparent member on the holding frame.

2. The display device according to claim 1, wherein the transparent member is a touch panel which includes transparent electrodes formed on a transparent substrate.

3. The display device according to claim 1, wherein, when fastening the fastening member to a housing from a rear side of the housing, the holding frame is pushed by the fixing member toward the transparent member and the bonding member is compressed.

4. The display device according to claim 1, wherein a height of the convex protrusion is equal to or less than a half of a thickness of the bonding member in a thickness direction.

5. A display device comprising:
a light source unit;
a holding frame that stores the light source unit therein;
a display panel that is disposed to face the light source unit;
a transparent member that is disposed on a front surface side of the display panel;
a fixing member, which is arranged at a rear side of the holding frame;
a housing, which is arranged at the front surface side of the transparent member; and
a fastening member for fastening the fixing member to the housing,
wherein the holding frame includes a planar portion which is formed to face a periphery portion of a rear surface side of the transparent member,
wherein the holding frame includes a bonding member which is disposed on the planar portion and bonds the transparent member and the holding frame,
wherein the planar portion is provided with a convex protrusion protruding toward the transparent member,
wherein a height of the convex protrusion is equal to or less than a half of a thickness of the bonding member in a thickness direction,
wherein the fixing member applies a first fixing force in a first direction towards the rear surface side of the transparent member,
wherein the housing applies a second fixing force in a second direction towards the front side of the transparent member,
wherein the display panel is not fixed to the holding frame,
wherein the display panel is attached to a central portion of the rear surface side of the transparent member, the central portion located closer to a center of the rear surface side of the transparent member than the periphery portion,
wherein the first fixing force and the second fixing force do not pass through the display panel in a thickness direction thereof,
wherein the first fixing force and the second fixing force pass through the periphery portion of the transparent member, the bonding member and the planar portion of the holding frame in a thickness direction thereof, and
wherein the bonding member comprises a transparent adhesive member extended so as to surround substantially a whole circumference of the planar portion of the holding frame to fix the transparent member on the holding frame.

* * * * *